J. STONE.
Clutch-Pulley.

No. 219,995. Patented Sept. 23, 1879.

Witnesses.
L. F. Connor.
N. E. Whitney.

Inventor.
Joseph Stone
by Crosby & Gregory Attys

UNITED STATES PATENT OFFICE.

JOSEPH STONE, OF BOSTON, MASSACHUSETTS.

IMPROVEMENT IN CLUTCH-PULLEYS.

Specification forming part of Letters Patent No. 219,995, dated September 23, 1879; application filed August 9, 1879.

*To all whom it may concern:*

Be it known that I, JOSEPH STONE, of Boston, county of Suffolk, State of Massachusetts, have invented an Improvement in Clutch-Pulleys, of which the following description, in connection with the accompanying drawings, is a specification.

This invention relates to clutch or driving pulleys for looms and other machinery; and consists, chiefly, in the combination, with the loose pulley and shaft on which it runs, of a cone-faced plug having a diagonal or inclined oil-passage and a bearing having a conical seat or cavity to receive the conical face of the plug, the inclined oil-passage during the rotation of the plug with the sleeve of the loose pulley tending to draw the oil into the opening at the center of the plug, and discharge it at the opposite side of the plug, whereas, the said plug, if the hole were made through it axially, would simply permit the oil to run through it, but would not draw the oil so as to always keep well lubricated the shaft on which the loose pulley runs, it requiring more oil than the bearing between the plug and its bearing.

Figure 1:
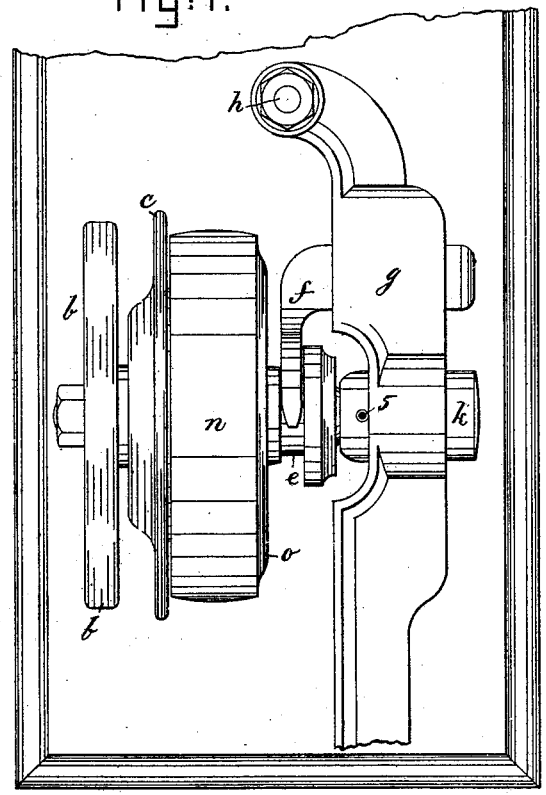
Figure 2:
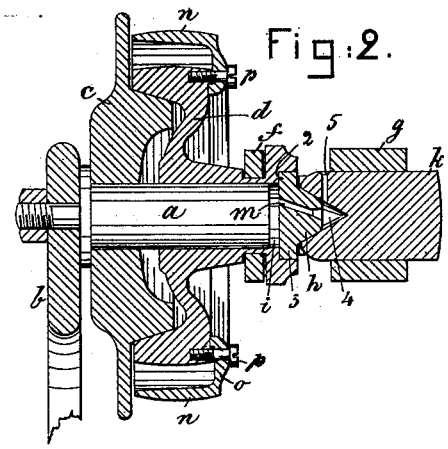

Figure 1 represents a plan view of a sufficient part of a fast and loose friction pulley to illustrate my invention, and Fig. 2 a longitudinal section thereof.

The shaft $a$ may be considered to be the main driving-shaft of a loom, it being supported in any usual way, so as to turn in a suitable bearing in the frame $b$, and $c$ is the pulley fast thereon.

The loose pulley $d$ has its hub provided with an external annular groove, $e$, to receive the forked arm $f$, connected with the shipping-lever $g$, pivoted at $h$, the said lever being under the control of any usual shipping devices, or being operated by hand to engage or disengage the conically-recessed face of the loose pulley from the cone-shaped face of the fast pulley, said pulleys being of the class known as "friction-pulleys."

At its outer end the hub of the loose pulley is provided with a seat, 2, (see Fig. 2,) to receive within it the peripherical base 3 of the conical plug $h$, held loosely in the seat 2, a space, $i$, being left between the base of the plug and the end of shaft $a$ for the reception of oil by which to oil the contact-surfaces of the loose pulley and shaft $a$.

The cone part $h$ enters a conical recess or seat, 4, larger than it, made at the end of a bearing-block, $k$, secured in the lever $g$, this bearing in practice being provided with an oil-passage, 5, by which to introduce oil into the recess 4, from which recess the oil is positively drawn by the action of the inclined passage $m$, (see Fig. 2,) made from the center of the cone part of the loose plug $h$ diagonally to its axis, and emerging from the said plug at its rear side at a point out of the axial center of the said plug revolving with the pulley. This inclined oil-passage $m$ acts to draw the oil from recess 4 into the space $i$. This loose plug does not require screws to hold it in position, is a very simple and cheap device, and when worn may be quickly removed and a new one may be dropped into its place.

The cast-metal lagging or annular ring $n$, having a flange, $o$, is herein shown as attached to the loose pulley $d$ by means of fastening devices $p$, (shown as screws extended through the said flange $o$ and into the side of the pulley.)

I am aware that a cone-bearing with an axial oil-passage is old in various machines.

I claim—

1. The fast and loose friction-pulleys, the loosely-held revolving conical plug having its base or large end supported by a seat at the end of the hub of the loose pulley, combined with a bearing having a conical cavity for the reception of the smaller cone-shaped end of the plug and a lever to hold the bearing, all substantially as described.

2. In combination, the loose pulley, the loosely-supported cone having its base fitted into a recess in the hub or sleeve of the pulley, and provided with an inclined oil-passage, $m$, as described, to draw oil through the plug, and a bearing external to the end of the loose pulley, the said bearing being provided with a conical recess or oil-chamber, 4, all substantially as described.

In testimony whereof I have signed my name to this specification in the presence of two subscribing witnesses.

JOSEPH STONE.

Witnesses:
G. W. GREGORY,
N. E. WHITNEY.